No. 778,866. Patented January 3, 1905.

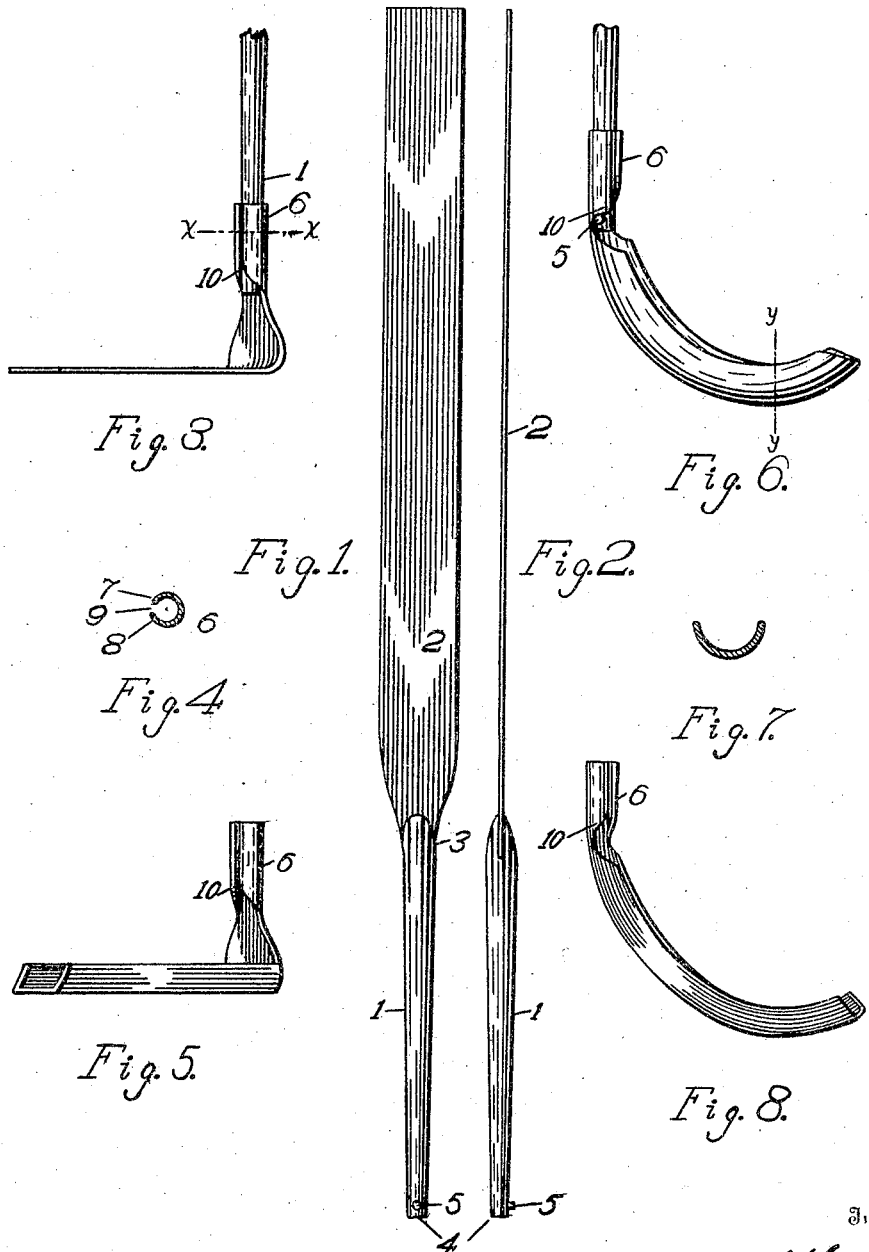

UNITED STATES PATENT OFFICE.

EDWARD ITTERLY, OF SCRANTON, PENNSYLVANIA.

MOLDER'S IMPLEMENT.

SPECIFICATION forming part of Letters Patent No. 778,866, dated January 3, 1905.

Application filed November 27, 1903. Serial No. 182,771.

*To all whom it may concern:*

Be it known that I, EDWARD ITTERLY, a citizen of the United States, residing at the corner of Nay Aug avenue and Electric street, Scranton, in the county of Lackawanna and State of Pennsylvania, have invented certain new and useful Improvements in Molders' Implements, of which the following is a specification.

This invention relates to molders' tools or implements; and the objects of the invention are to provide a multiple number of trowels suitably attachable and detachable from a common handle, to improve the method of attachment of such tools, and other objects as specified herein and pointed out in the claims.

To these ends the invention consists of the arrangement, construction, and combination of the several parts specified and illustrated in the drawings, in which—

Figure 1 is a view of the handle of my implement. Fig. 2 is a similar view taken at right angles to that of Fig. 1. Fig. 3 is a view showing a trowel attached to the handle end. Fig. 4 is a cross-section taken on the line X X of the socket of the trowel shown in Fig. 3. Fig. 5 shows a modified form of trowel to be used with the handle. Fig. 6 shows an additional modification of trowel to be used. Fig. 7 shows a cross-section taken on the line Y Y of Fig. 6. Fig. 8 is an additional modified form of trowel used in the invention.

Similar characters of reference denote like and corresponding parts throughout the several views.

Referring to the drawings, 1 denotes a shank or handle to which a spatula or blade 2 is attached at 3. The said handle is round in cross-section and tapering to the lower point 4, a pin or stub 5 being secured to the lower end 4. A series of trowels or molders' tools are adapted to be connected to the lower end of the shank 1, each of said tools being provided with a clasping-socket 6 to serve the purpose aforesaid, the socket 6 having lips 7 and 8 extending around the shank 1, so as to clasp it tightly, the opening 9 between said lips serving to allow the pin 5 to be passed down between them in order that it may be hooked under a shoulder 10, by means of which the trowel is retained in its position on the end of the shank. The shoulder 10 in each of the trowels to be fitted to the shank are sloped in such a manner that when the trowel is turned the sloping edge of the shoulder 10 draws the shank longitudinally into the socket, thus tightening the same and causing the same to be tightly clasped into position.

In the operation of the device it is apparent that the spatula end is always ready for use, whether a trowel is attached or not, and any form of a trowel required may be provided and attached readily to the end 4 of the shank 1, as explained. This arrangement obviates the necessity of having a separate spatula-handled tool for each of the little trowels which are to be used by the molder. It is understood by artisans in this line that many variations of the small trowels are required and that the small trowel in every instance ought to have a spatula end for smoothing the molds. The utility of this device is therefore apparent.

Having thus described my invention, what I claim, and desire to secure by Letters Patent, is—

1. In a molder's implement, a tapered shank having a spatula-blade at one end, a stud near the smaller end of the shank, a detachable member provided with a split socket and cam-shoulders formed at the lower end of the split, said socket being adapted to receive the smaller end of the shank and to be locked thereon by the stud engaging one of the cam-shoulders.

2. In a molder's implement, a tapered shank having a spatula-blade at one end, the tapered end being adapted to be wedged in a socket of a detachable member, and means on the tapered end and socket whereby a turn of the detachable member in either direction will further wedge said shank in the socket and hold it in said position.

In testimony whereof I affix my signature in presence of two witnesses.

EDWARD ITTERLY.

Witnesses:
CHAS. W. DAWSON,
SUSAN L. DAWSON.